U.S. Cl. 260—397.3   13 Claims

United States Patent Office 3,504,002
Patented Mar. 31, 1970

3,504,002
SELECTED 6-DIFLUOROMETHYLENE STEROIDS OF THE PREGNANE SERIES
George Albert Boswell, Jr., Green Acres, Wilmington, Del., and Eugene A. La Lancette, Lansdowne, Pa., assignors to E. I. du Pont de Nemours and Company, Wilmington, Del., a corporation of Delaware
No Drawing. Filed Aug. 29, 1967, Ser. No. 663,945
Int. Cl. C07c *169/34;* A61k *17/06*

ABSTRACT OF THE DISCLOSURE

This application describes and claims 6-difluoromethylene steroids of the pregnane series prepared by reacting a 3β-acyloxy-5α-fluoro-6-keto pregnane with at least equimolar amounts of tributylphosphine and sodium chlorodifluoroacetate relative to the steroid starting material at a temperature in the range 150–200° C. The 6-difluoromethylene pregnanes of this invention possess anti-androgenic, anti-estrogenic and anti-gonadotropic activity and are especially useful as orally active progestational hormones and inhibitors of ovulation.

BACKGROUND OF THE INVENTION

Field of the invention

This invention relates to new fluorine-containing steroids and to a method by which they may be prepared. More specifically, the invention relates to certain steroids of the pregnane series in which the carbon atom at the 6-position bears a difluoromethylene substituent, $=CF_2$, and to a method by which the 6-difluoromethylene function may be introduced into steroids of the pregnane series using the corresponding 6-oxo pregnanes as starting material.

Description of the prior art 6-dichloromethylene and 6-dibromomethylene-3-keto-Δ[4]-steroids of the androstane and pregnane series are known and are described by Liisberg et al. in Tetrahedron, 9, 149–155 (1964). In addition, 6-dichloromethylene and 6-dibromomethylene-16-methylene-3-keto-Δ[4] steroids of the pregnane series are disclosed in U.S. Patent 3,157,679 to Bork.

The difluoromethylene steroids of this invention, however, are believed to be novel compounds. The only steroids of this type known to have been described previously are the 3-difluoromethylene steroids disclosed and claimed in the La Lancette U.S. Patent 3,450,720. These compounds are estrane or androstane derivatives having anti-androgenic properties.

The reaction in which an oxo function is converted to a difluoromethylene group as applied to certain non-steroidal ketones has been described by Faqua, Duncan and Silverstein in J. Org. Chem., 30, 2543 (1965). Its only successful application in the preparation of difluoromethylene steroids other than those of the present invention is believed to be in the preparation of the 3-difluoromethylene steroids recited in the La Lancette application.

SUMMARY AND DETAILS OF THE INVENTION

The new steroids of this invention have one of the following formulas:

(I)

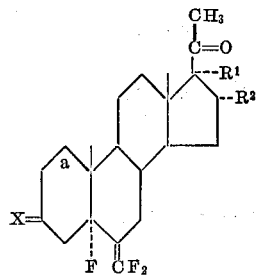

and (II)

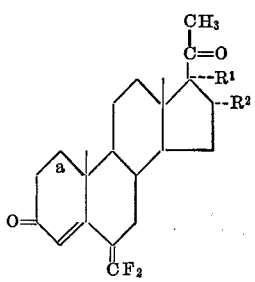

wherein X is

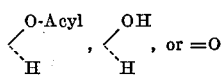

$R^1$ and $R^2$, which may be the same or different, are H, $CH_3$ or O-Acyl; and *a* is a single bond or a double bond.

In the above definition, "Acyl" is the acyl radical of a lower (1–6 carbon) alkanoic acid, for example, of formic, acetic, propionic, butyric, isobutyric, valeric, caproic or isocaproic acids.

The products of Formula I where X is

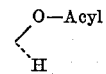

are prepared by reacting a 3β-acyloxy-5α-fluoro-6-keto steroid of formula (III)

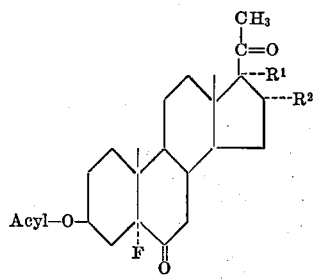

where all symbols have the previously stated significance, with at least equimolar amounts of tributylphosphine and sodium chlorodifluoroacetate relative to the steroid starting material at a temperature in the range of 150–200° C., using as the reaction medium an N,N-disubstituted hydrocarbon amide. In this reaction, the 6-oxo substituent is replaced by the difluoromethylene group. The 20-keto group, which is much less reactive, remains substantially unaffected.

There is thus obtained a steroid of formula (IV)

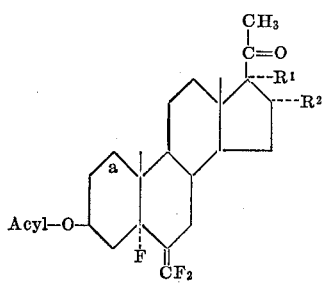

This kind of reaction, as applied to certain nonsteroidal ketones, has been described by Fuqua, Duncan and Silverstein, loc. cit. It is viewed as involving the in situ production of tributylphosphinedifluoromethylene. The latter then reacts with the carbonyl group of the keto compound in accordance with the schematic equation $$Bu_3P=CF_2+O=C< \rightarrow F_2C=C< +Bu_3P=O$$

The reaction whereby a 6-keto steroid is converted to a 6-difluoromethylene steroid is best carried out by dissolving the keto steroid and the tributylphosphine in the amide reaction medium, bringing the mixture to a temperature between 150 and 200° C., preferably between 160 and 190° C., and slowly adding a solution of sodium chlorodifluoroacetate in the amide medium to the hot mixture. This procedure is recommended in order to prevent build-up of undecomposed sodium chlorodifluoroacetate, which might result in a violent exothermic decomposition. Such a hazard is avoided by using the above indicated reaction temperature at which sodium chlorodifluoroacetate decomposes fairly rapidly, and by adding this reagent gradually to the reaction mixture.

The tributylphosphine and the sodium chlorodifluoroacetate are both used in at least equimolar ratio relative to the keto steroid. Preferably, there is used from 1.0 to 1.5 moles of tributylphosphine and from 1.3 to 2.0 moles of sodium chlorodifluoroacetate per mole of keto steroid.

The reaction medium or solvent for this reaction is generally a hydrocarbon amide, liquid at the reaction temperature, having no hydrogen on the amido nitrogen. Open chain aliphatic amides and cyclic amides in which the amido carbon and nitrogen are ring members (i.e., lactams) are suitable. Preferably, the amide reaction medium has a total of not more than 8 carbon atoms and is saturated hydrocarbyl except for the amide function

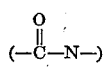

Examples of such reaction media are the lower N,N-dialkyl-amides, e.g., N,N-dimethyl-, diethyl- or dipropyl-formamide, N,N-dimethyl-, diethyl- or dipropylacetamide, N,N-dimethylpropionamide; the N-alkyl-lactams, e.g., N-methyl- or N-ethyl-2-pyrrolidone, N-methyl- or N-ethyl-2-piperidone, N-methyl-caprolactam; and the like. N-methyl-2-pyrrolidone is a preferred solvent. The amount of solvent used is not critical. It need only be sufficient to maintain good contact between the reactants. Dimethyl sulfoxide and diglyme can also be used as solvents.

The reaction is normally conducted at atmospheric pressure and under reflux if necessary, but it can also be conducted under pressure in a suitably designed apparatus.

The reaction product can be isolated by any desired suitable method. A convenient method consists of evaporating the reaction mixture to dryness and extracting the product with an appropriate organic solvent. The 6-difluoromethylene steroid can be purified by recrystallization and/or by chromatographic methods.

The starting materials used in the above-described process, i.e., the 3β-acyloxy-5α-fluoro-6-keto steroids of Formula III, are for the most part described in U.S. Patents 3,219,673 to G. A. Boswell and 3,320,291 to S. Andreades and G. A. Boswell. Other starting materials, such as those in which the 16-carbon atom bears an acyloxy or methyl substituent, can be prepared by the method described in these patents, using the appropriate 16-substituted steroid as the starting material.

Steroids of Formula I wherein the 3-substituent is hydroxyl or oxo are obtained from the products of Formula IV by conventional methods. Thus, treatment with an alkali metal hydroxide converts all acyloxy groups present to hydroxyl groups. Treatment with an alkali metal carbonate selectively hydrolyzes the 3β-acyloxy group, leaving other acyloxy groups substantially unaffected. Oxidation of the 3β-hydroxy steroids, for example, with chromium trioxide in sulfuric acid/acetone medium, gives the 3-keto steroids. There are thus obtained the products of formulas (V)

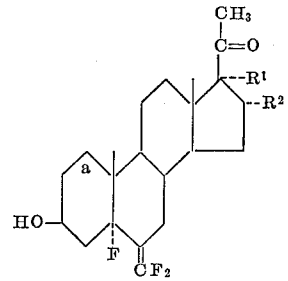

and (VI)

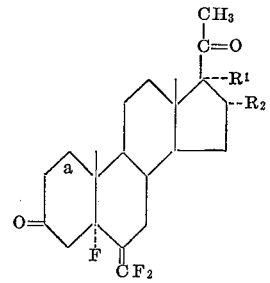

The 6-difluoromethylene-3-keto-Δ⁴ steroids of Formula II are prepared by treating the 5α-fluoro-6-difluoromethylene-3-keto steroids of Formula VI with a dehydrofluorinating agent, preferably a weak base such as alumina. The preferred dehydrofluorinating agent is the so-called "neutral" alumina of activity II–V, and the operating procedure is that described in detail in U.S. Patent 3,219,673, previously referred to.

In the various reactions just described, the starting materials may have Δ¹ unsaturation or, if desired, such unsaturation can be introduced subsequently by selective methods such as oxidation with selenium dioxide or dichlorodicyanobenzoquinone.

DESCRIPTION OF THE SPECIFIC EMBODIMENTS

There follow some nonlimiting examples illustrative of the invention.

Example 1.—3β,17α-diacetoxy-6-difluoromethylene-5α-fluoropregnane-20-one

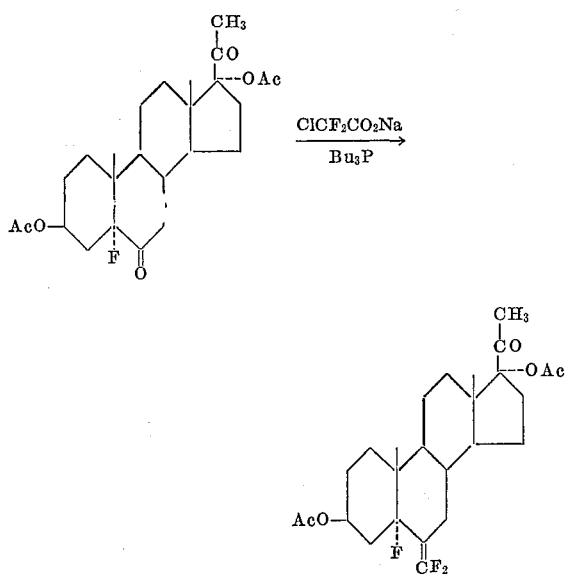

A solution of 13.7 g. (30 mmoles) of 3β,17α-diacetoxy-5α-fluoropregnane-6,20-dione (see U.S. Patent 3,219,673) and 10.4 g. (51 mmoles) of tributylphosphine in 15 ml. of N-methyl-2-pyrrolidone was heated to 180° C. To this solution was added dropwise with stirring over a period of 55 minutes a solution of 15.3 g. (100 mmoles) of sodium chlorodifluoroacetate in 45 ml. of N-methyl-2-pyrrolidone. The reaction mixture was dissolved in benzene and this solution was chromatographed on 1700 g. of neutral alumina (grade III). Elution with benzene gave 3,9555 g. of 3β,17α-diacetoxy-6-difluoromethylene - 5α-fluoropregnane-20-one, then 0.893 g. of a mixture of this reaction product with starting material. Further elution gave 6.239 g. of unchanged starting material.

The first eluate was further purified by crystallization from acetone-hexane or from hexane. An analytical sample had M.P. 208.4–208.6° C. (dec.) and $[\alpha]_D^{24}$ —33° (c. 1.38, CHCl$_3$). However, various samples of 3β,17α-diacetoxy-6-difluoromethylene - 5α - fluoropregnane - 20-one exhibited very sharp melting points at temperatures from 153 to 209° C.

*Analysis.*—Calcd. for $C_{26}H_{35}F_3O_5$ (percent): C, 66.44; H, 7.28; H, 11.76. Found (percent): C, 64.82; H, 7.23; F, 11.85.

*Infrared.*—$\lambda_{max}$ 5.74μ and 5.80μ (shoulder).

Using the same procedure, 3β-acetoxy-17α-methyl-5α-fluoropregnane-6,20-dione is converted to 3β-acetoxy-6-difluoromethylene-17α-methyl-5α-fluoropregnane - 20 - one. Other 3β - acyloxy-6-difluoromethylene-17α-methyl - 5α-fluoropregnane-20-one are obtained similarly, for example, those in which the 3β-acyloxy group is the propionyloxy or caproyloxy radical. Likewise, the starting material in the detailed example can be replaced by those in which the 3β- and/or 17α-acetoxy groups are replaced by other acyloxy groups, e.g., butyryloxy or valeroyloxy groups, to give the corresponding 3β,17α-diacyloxy-6-difluoromethylene-5α-fluoropregnane-20-ones. The same reaction applied to a Δ$^1$-unsaturated starting material leads, for example, to 3β,17α-diacetoxy-6-difluoromethylene-5α-fluoro-1-pregnane-20-one.

Example 2.—6-difluoromethylene-3β,17α-dihydroxy-5α-fluoropregnane-20-one

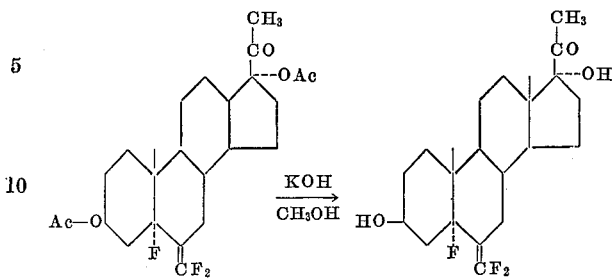

A solution of 1.0 g. (2.1 mmoles) of 3β,17α-diacetoxy-6-difluoromethylene-5α-fluoropregnane-20-one in 25 ml. of a 0.15 N methanolic potassium hydroxide solution was refluxed for 3.5 hours. The reaction mixture was evaporated to dryness and the residue partitioned between ethyl acetate and water. The ethyl acetate solution was washed with water, dried over calcium sulfate, filtered and evaporated under reduced pressure. There was obtained 0.825 g. of 6-difluoromethylene-3β,17α-dihydroxy-5α-fluoropregnane-20-one, M.P. 170° C. (dec.). An analytical sample crystallized from acetone-hexane had M.P. 197° C. (dec.) and $[\alpha]_D^{24}$ —58° (c. 1.32, CHCl$_3$).

*Analysis.*—Calcd. for $C_{22}H_{31}F_3O_3$ (percent): C, 65.98; H, 7.80; F, 14.23. Found (percent): C, 66.44; H, 7.65; F, 13.97.

*Infrared.*—$\lambda_{max}$ 2.95μ (OH), 5.72μ (C=CF$_2$), and 5.86μ (C=O).

Example 3.—17α-acetoxy-6-difluoromethylene-3β-hydroxy-5α-fluoropregnane-20-one

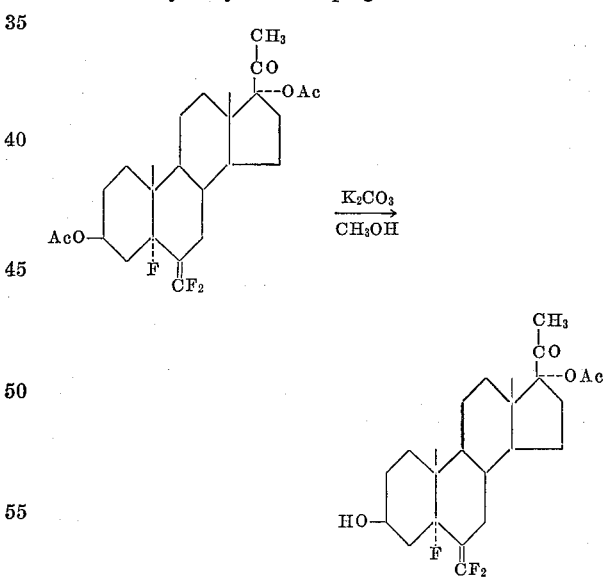

A solution of 3β,17α-diacetoxy-6-difluoromethylene-5α-fluoropregnane-20-one (1.05 g.; 2.16 mmoles; M.P. 203–206° C.) in methanol (100 ml.), which had been deaerated with a slow stream of nitrogen, was treated with anhydrous potassium carbonate (0.299 g., 2.16 mmoles) in deaerated water (7 ml.). The resultant solution was allowed to stand at ambient temperature for 20 hours under nitrogen. Careful addition of water caused the precipitation of colorless needles amounting to 485 mg. The filtrate was diluted with saturated salt solution and thoroughly extracted with methylene chloride solution. The methylene chloride extracts were washed with water and saturated salt solution, dried over magnesium sulfate, and evaporated to dryness to afford an additional 0.4 g. of solid product. This was combined with the precipitate from above and adsorbed from a small volume of benzene onto alumina (25 g., activity III). Elution with hexane (1st four fractions) brought off most of the product as an oil which solidified. These were recrystallized twice from acetone-hexane to furnish analytically pure 17α-acetoxy-6-difluoromethylene-3β-hydroxy-5α - fluoropregnane - 20-one (135 mg.) as colorless needles, M.P. 220–221° C., $[\alpha]_D^{24}$ —41° (dioxane).

Analysis.—Calcd. for $C_{24}H_{33}F_3O_4$ (percent): C, 65.14; H, 7.52; F, 12.88. Found (percent): C, 65.80; H, 7.66; F, 12.62.

Infrared.—$\lambda_{max}$. 2.82μ (O—H), 5.74μ (C=CF$_2$, strong and sharp), 5.82μ (acetate and C–20 carbonyl), 8.0μ (acetate O—C).

Using the same procedure, other 3β,17α-diacyloxy-6-difluoromethylene-5α-fluoropregnane-20-ones can be selectively hydrolyzed at the 3-position to give the corresponding compounds having another 17α-acyloxy group, for example, a propionoxy or isobutyroxy group. Similarly, 3β,17α-diacetoxy-6-difluoromethylene - 5α-fluoro-1-pregnene-20-one can be converted to 17α-acetoxy-6-defluoromethylene-3β-hydroxy-5α-fluoro-1-pregnene-20-one.

Example 4.—3β-acetoxy-6-difluoromethylene-5α-fluoropregnane-20-one

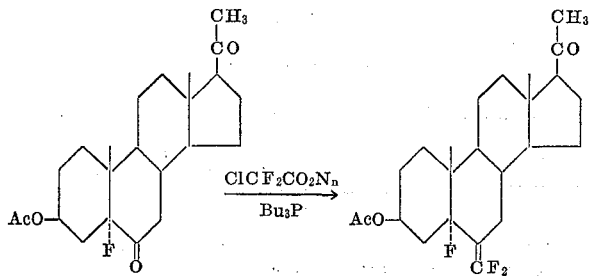

To a solution of 15 g. (38.2 mmoles) of 3β-acetoxy-5α-fluoropregnane-6,20-dione (see U.S. Patent 3,219,673) and 13.2 g. (65.2 mmoles) of tributylphosphine in 19 ml. of N-methyl-2-pyrrolidone heated to 180° C. was added over a period of 60 minutes a solution of 19.8 g. (0.13 mole) of sodium chlorodifluoroacetate in 58 ml. of N-methyl-2-pyrrolidone. The reaction mixture was evaporated to dryness under reduced pressure and the residue was partitioned between ethyl acetate and water. The organic phase was washed with an aqueous sodium bicarbonate solution, then with an aqueous salt solution and dried over calcium sulfate. After filtering and evaporating to dryness, 3β-acetoxy-6-difluoromethylene-5α-fluoropregnane-20-one was obtained as an oil which crystallized after chromatographic treatment. Two recrystallizations from hexane gave a product melting at 165–166° C.

Analysis.—Calcd. for $C_{24}H_{33}F_3O_3$ (percent): C, 67.74; H, 7.80; F, 13.36. Found (percent): C, 67.95; H, 7.75; F, 13.39.

3β - acetoxy - 6 - difluoromethylene - 5α - fluoro - 1-pregnene-20-one can be obtained by the same procedure, starting from the corresponding 3β-acetoxy-5α-fluoro-1-pregnene-6,20-dione.

Example 5.—6-difluoromethylene-3β-hydroxy-5α-fluoropregnane-20-one

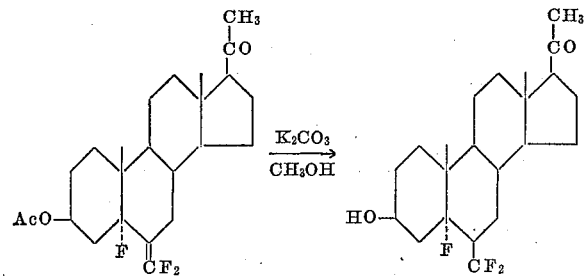

A solution of 0.45 g. of 3β-acetoxy-6-difluoromethylene-5α-fluoropregnane-20-one in 12 ml. of 0.15 N methanolic potassium hydroxide was heated at reflux for 3 hours in a nitrogen atmosphere. Dilution of the reaction mixture with cold water precipitated a colorless product which was collected on a filter, washed with water and air-dried, yield 0.374 g., M.P. about 130° C. Recrystallization from acetone-hexane gave pure 6-difluoromethylene-3β-hydroxy-5α-fluoropregnane-20-one as crystals melting at 179–181° C.

Analysis.—Calcd. for $C_{22}H_{30}F_3O_2$ (percent): C, 68.90; H, 7.89; F, 14.86. Found (percent): C, 68.92; H, 8.01; F, 14.63.

Chromic acid oxidation of this product gives 6-difluoromethylene-5α-fluoropregnane-3,20-dione, which can be dehydrofluorinated over neutral alumina to 6-difluoromethylene-4-pregnene-3,20-dione.

Example 6.—17α-acetoxy-6-difluoromethylene-5α-fluoropregnane-3,20-dione

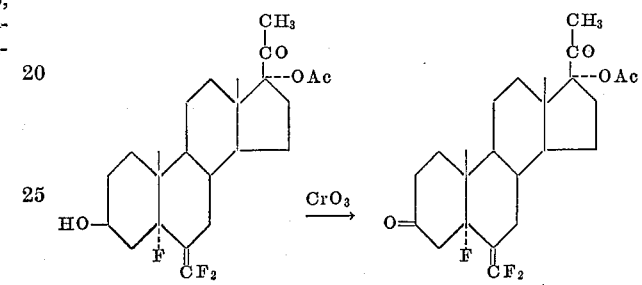

A solution of 0.55 g. of 17α-acetoxy-6-difluoromethylene-3β-hydroxy-5α-fluoropregnane-20-one in 50 ml. of acetone was cooled to 10° C. and treated with excess 8 N chromic acid solution (permanent orange-red color). After being stirred at ambient temperature for 20 minutes, the reaction mixture was diluted with a few milliliters of methanol. The resultant green solution was filtered to remove precipitated chromium salts and then carefully diluted wth hot water. The product soon precipitated in the form of colorless needles, yield 197 mg., M.P. 224° C. An analytical sample prepared by recrystallization from acetone-hexane had M.P. 228–233° C. and $[\alpha]_D^{24}$ —53° (dioxane).

Analysis.—Calcd. for $C_{24}H_{31}F_3O_4$ (percent): C, 65.40; H, 7.05; F, 12.90. Found (percent): C, 65.85; H, 6.70; F, 12.99.

Infrared.—$\lambda_{max}$. 5.74μ (C=CF$_2$, shoulder), 5.78μ (acetate carbonyl), 5.83μ (C–3 and C–20 carbonyls, shoulders), 8.0μ (—O—C acetate, broad).

17α - acetoxy - 6 -difluoromethylene - 5α - fluoro - 1-pregnene-3,20-dione can be obtained in the same manner, starting with the corresponding 3β-hydroxy-Δ$^1$ steroid, and 17α-methyl-6-difluoromethylene-5α-fluoropregnane- and 5α-fluoro-1-pregnene-3,20-dione are also prepared similarly from the corresponding 3β-hydroxy-17α-methyl steroids.

Example 7.—17α-acetoxy-6-difluoromethylene-4-pregnene-3,20-dione

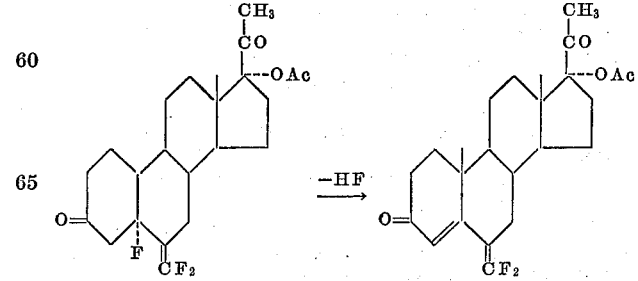

A solution of 0.30 g. of 17α-acetoxy-6-difluoromethylene-5α-fluoropregnane-3,20-dione in about 10 ml. of benzene was adsorbed onto neutral alumina (20 g., activity III). Elution with benzene followed by recrystallization of the eluted solid from methylene chloride-hexane gave 185 mg. (1st crop) and 50 mg. (2nd crop) of 17α- acetoxy-6-difluoromethylene-4-pregnene-3,20-dione, M.P. 215–218° C.

Analysis.—Calcd. for $C_{24}H_{30}F_2O_4$ (percent): C, 68.50; H, 7.17; F, 9.05. Found (percent): C, 68.16; H, 7.20; F, 9.62.

Infrared.—$\lambda_{max.}$ 5.79μ (acetate carbonyl and C=CF$_2$), 5.85μ (C–20 carbonyl), 5.98μ (conj. C–3 carbonyl), 6.19μ (conj. cyclic C=C), 8.0μ (acetate O—C).

Ultraviolet.—$\lambda_{max.}$ 238 mμ (6270) and 267 mμ (7820).

The same dehydrofluorination procedure applied to the appropriate steroid starting materials affords 17α-acetoxy-6-difluoromethylene-1,4-pregnadiene-3,20 - dione (or other 17α-acyloxy compounds) and 17α-methyl-6-difluoromethylene-4-pregnene-3,20-dione, as well as the corresponding 1,4-pregnadiene-3,20-dione.

Example 8.—3β-acetoxy-6-difluoromethylene-16α-methyl-5α-fluoropregnane-20-one

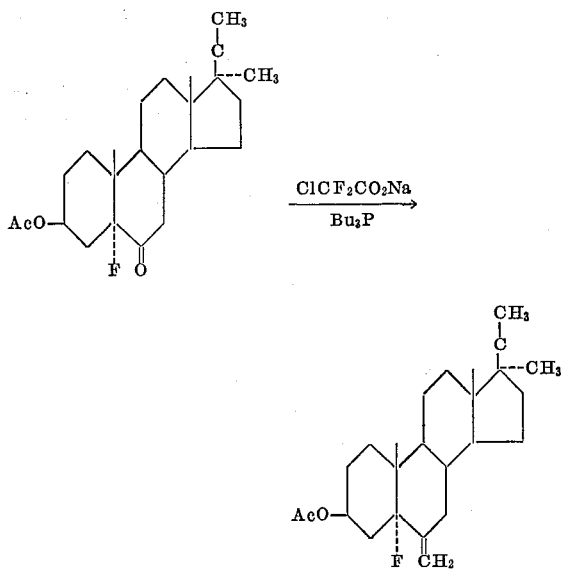

The starting material for this example was prepared by the general procedure of U.S. Patents 3,219,673 and 3,320,291, as follows:

Into a stirred solution of 3β-acetoxy-16α-methyl-5-pregnene-20-one (50 g.) in methylene chloride (150 ml.) at 0° C. was bubbled a slow stream of nitrosyl fluoride (19 g.) for 7 hours. The reaction mixture was poured into water and extracted several times with carbon tetrachloride. The combined extracts were washed with water and saturated sodium chloride solution and dried over magnesium sulfate. The solvent was removed under reduced pressure, leaving a green oil whose infrared spectrum showed strong nitrimine bands. This material was adsorbed from benzene onto neutral alumina (1200 g., activity III). Elution with hexane, hexane-benzene (1:1) and benzene returned crystalline fractions of 3β-acetoxy-16α-methyl - 5α - fluoropregnane-6,20-dione, which were combined. Recrystallization from methylene chloride-hexane gave the product (29. g.) as crystals melting at 183–187° C., $[\alpha]_D^{24}$ +30° (CHCl$_3$). The mother liquors afforded an additional 5.6 g. of less pure product.

Analysis.—Calcd. for $C_{24}H_{35}FO_4$ (percent): C, 71.00; H, 8.68; F, 4.68. Found (percent): C, 71.16; H, 8.74; F, 5.09.

To a stirred solution heated at 180° C. of 3β-acetoxy-16α-methyl-5α-fluoropregnane-6,20-dione (27.5 g.) and tributylphosphine (25 g.) in N-methyl-2-pyrrolidone (35 ml.) was added over a period of 80 minutes a warm (50° C.) solution of sodium chlorodifluoroacetate (30.5 g.) in N-methyl-2-pyrrolidone (100 ml.), the operation being blanketed with nitrogen. The dark reaction mixture was concentrated under reduced pressure to a thick slurry which was adsorbed from mixture of benzene and hexane onto neutral alumina (1000 g., activity III). Elution with hexane returned in the first 16 fractions a yellow oil whose nuclear magnetic resonance spectrum was in accord with the structure of the expected 6-difluoromethylene steroid. The later cuts from this chromatography were combined and recrystallized to give 12.67 g. of unreacted starting material.

Fractions 4–16 were combined to give 6.5 g. of oily product which was adsorbed from benzene onto fresh neutral alumina (200 g., activity III). Elution with hexane (eight 150-ml. fractions) gave only traces of oil. Elution with hexane-benzene (4:1 fractions 9–23), (3:1, fractions 24–26), (2:1, fractions 27–31), (1:1, fractions 32–34), and benzene (fractions 35–37) returned nearly colorless syrups which slowly crystallized. Three center cuts (fractions 14, 15, 16) were crystallized from hexane to afford thick colorless rods of 3β-acetoxy-6-difluoromethylene-16α-methyl-5α-fluoropregnane - 20 - one (190 mg.), M.P. 130–133° C., $[\alpha]_D^{24}$ +17° (CHCl$_3$).

Analysis.—Calcd. for $C_{25}H_{35}F_3O_3$ (percent): C, 68.20; H, 7.98; F, 12.90. Found (percent): C, 68.15; H, 7.89; F, 12.98.

Infrared.—$\lambda_{max.}$ 5.75μ (=CF$_2$ and acetate carbonyl), 5.87μ (C–20 carbonyl), 8.0μ (acetate O—C).

Example 9.—6-difluoromethylene-3β-hydroxy-16α-methyl-5α-fluoropregnane-20-one

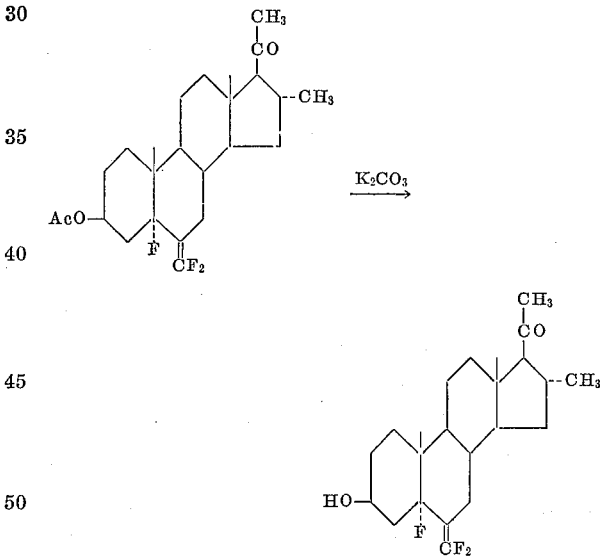

To a stirred solution of 3β-acetoxy-6-difluoromethylene-16α-methyl-5α-fluoropregnane-20-one (3.0 g., 6.80 mmoles) in deaerated methanol (150 g.) under nitrogen was added anhydrous potassium carbonate (1.035 g., 7.5 mmoles) in distilled, deaerated water (42 ml.). Since the addition of the aqueous solution caused the steroid to separate from solution as an oil, dioxane (ca. 20 ml.) was added until a clear colorless solution was obtained. The resultant solution was stirred overnight at ambient temperature, during which time a colorless solid precipitated. The solid was collected on a filter, washed well and air-dried, yield 2.18 g., M.P. 177–178° C. An analytical sample prepared by recrystallization from acetone-hexane had M.P. 177–178° C. and $[\alpha]_D^{24}$ +17° (CHCl$_3$). The 6 - difluoromethylene - 3β - hydroxy - 16α-methyl-5α-fluoropregnane-20-one so obtained contained one-half mole of hexane of crystallization.

Analysis.—Calcd. for $C_{23}H_{33}F_3O_2 \cdot 1/2C_6H_{14}$ (percent): C, 70.90; H, 9.10; F, 12.90. Found (percent): C, 71.03; H, 8.74; F, 12.09.

Infrared.—$\lambda_{max.}$ 2.93μ (O—H), 5.73μ (=CF$_2$), 5.88μ (C–20 carbonyl).

Example 10.—6-difluoromethylene-16α-methyl-5α-fluoropregnane-3,20-dione

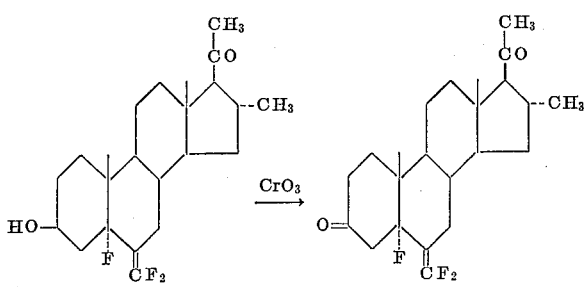

To a stirred solution of 6-difluoromethylene-3β-hydroxy-16α-methyl-5α-fluoropregnane-20-one (1.60 g.) in acetone (50 ml.) cooled to 10° C. was added dropwise an excess of 8 N chromic acid reagent (permanent orange-red color). The resultant mixture was stirred at ambient temperature for 20 minutes, after which time a few milliliters of methanol was added in order to consume the excess oxidizing agent. The green reaction mixture was filtered to remove the chromium salts and the filtrate was carefully diluted with warm water. The solid precipitate which formed on standing was collected on a filter, washed well with water and air-dried, yield 1.20 g., M.P. 180° C. An analytical sample in the form of colorless needles prepared by recrystallization from acetone-hexane had M.P. 181–185° C. and $[\alpha]_D^{24}$ +6° (c. 1.08, dioxane).

Analysis.—Calcd. for $C_{22}H_{31}F_3O_2$ (percent): C, 69.80; H, 7.87; F, 14.35. Found (percent): C, 69.78; H, 7.89; F, 14.20.

Infrared.—$\lambda_{max}$. 5.76μ (=CF_2), 5.86μ (C–3 and C–20 carbonyls).

The reaction sequence described in Examples 8–10, when applied to other 3β-acyloxy-5α-fluoropregnane-6,20-diones having the appropriate 16α- and/or 17α-substituents, leads to other steroids of this invention, for example, to 3β,16α-diacetoxy - 6 - difluoromethylene-5α-fluoropregnane-20-one; 16α-acetoxy - 6 - difluoromethylene-3β-hydroxy - 5α - fluoropregnane-20-one; 16α-acetoxy-6-difluoromethylene - 5α - fluoropregnane - 3,20 - dione; 3β,17α-diacetoxy - 6 - difluoromethylene-16α-methyl-5α-fluoropregnane-20-one and the derived steroids where the 3-substituent is β-hydroxy and oxo; and 3β-acetoxy-6-difluoromethylene-16α,17α-dimethyl - 5α - fluoropregnane-20-one and the derived steroids where the 3-substituent is β-hydroxy and oxo. Furthermore, Δ¹ unsaturation can be present in the compounds just mentioned when the starting material is unsaturated at this position.

Example 11.—6-difluoromethylene-16α-methyl-4-pregnene-3,20-dione

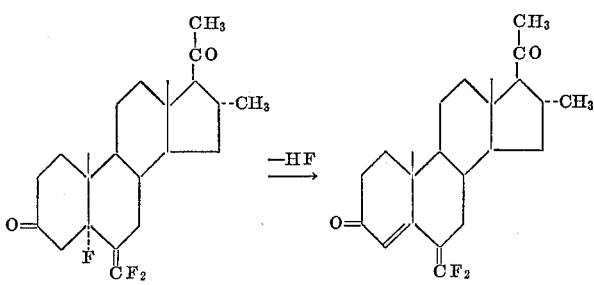

6-difluoromethylene-16α-methyl - 5α - fluoropregnane-3,20-dione (0.91 g.) was adsorbed from benzene (10 ml.) onto neutral alumina (30 g., activity III). Elution with hexane-benzene (1:1) returned a colorless crystalline solid which was recrystallized from hexane-petroleum ether (B.P. 30–60° C.) to furnish 6-difluoromethylene-16α-methyl-4-pregnene-3,20-dione (419 mg., 1st crop; 151 mg., 2nd crop) in the form of massive colorless crystals, M.P. 135–138° C.; $[\alpha]_D^{24}$ +292° (c. 0.51, dioxane).

Analysis.—Calcd. for $C_{23}H_{30}F_2O_2$ (percent): C, 73.48; H, 8.05; F, 10.00. Found (percent): C, 73.87; H, 8.62; F, 9.94.

Infrared.—$\lambda_{max}$. 5.80μ (=CF_2), 5.85μ (C–20 carbonyl), 5.95μ (C–3 conj. carbonyl), 6.22μ (conj. ring C=C).

Ultraviolet.—$\lambda_{max}$. 242 mμ (7180) and 268 mμ (8740).

The same dehydrofluorination procedure, when applied to other 6-difluoromethylene - 5α - fluoropregnane-3,20-diones having the appropriate 16α- and/or 17α-substituents, yields other steroids of this invention, for example, 16a - acetoxy-6-difluoromethylene-4-pregnene-3,20-dione; 17α-acetoxy - 6 - difluoromethylene-16α-methyl-4-pregnene-3,20-dione; and 6-difluoromethylene - 16α,17α - dimethyl-4-pregnene-3,20-dione. The corresponding 1,4-pregnadienes can be obtained similarly from starting materials having Δ¹ unsaturation.

Example 12.—6-difluoromethylene-17α-hydroxypregna-1,4-dien-3,20-dione acetate (2)

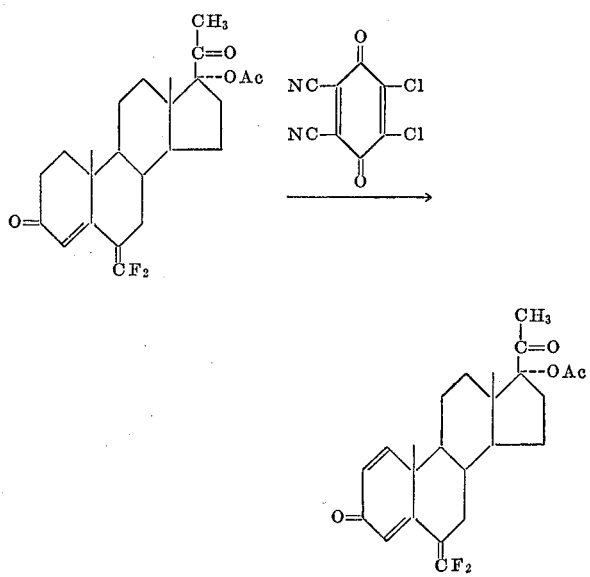

A solution of 6-difluoromethylene-17α-acetoxy-4-pregnene-3,20-dione (0.05 g.), p-toluenesulfonic acid (about 0.001 g.), dichlorodicyano-p-quinone (about 0.05 g.) and dry dioxane (20 ml.) was heated at reflux under nitrogen for 4 hours and then allowed to stand at ambient temperature for 72 hours. The precipitated hydroquinone was removed by filtration and the filtrate was diluted with 200 ml. of water. The product was extracted with benzene. The benzene extracts were washed successively with 5% sodium bicarbonate solution, 5% sodium hydroxide solution, water, and saturated salt solution, dried over anhydrous magnesium sulfate, and evaporated under reduced pressure to afford a tan syrup which was adsorbed from benzene onto neutral alumina. Elution with benzene gave first recovered starting material identified by infrared and comparison thin layer chromatography, second mixed fractions, and finally 6-difluoromethylene-17α-hydroxypregna-1,4-dien-3,20-dione acetate as a colorless crystalline solid whose identity was shown by spectroscopic means and thin layer chromatography.

The 6-difluoromethylene steroids of this invention exhibit a variety of desirable and useful biological activities. They are especially useful as orally active progestational hormones and as inhibitors of ovulation. In addition these compounds possess valuable anti-fertility properties which make them particularly effective in controlling pest populations and in preventing unwanted pregnancies in domestic animals.

The steroids of this invention also possess anti-androgenic activity. Such activity is shown by the fact that these compounds are able to inhibit the hormonal action of simultaneously administered testosterone in castrate male mice. For example, the compound of Example 11, 6-difluoromethylene-16α-methyl-4-pregnane - 3,20 - dione, blocks the androgenic (verilizing) action of testosterone as determined by measuring the induced hypertrophy of the seminal vesicles of test animals. The use of the compound of Example 11 as an anti-androgen is given in Example A, below:

Example A.—Protocol for anti-androgen assays 6-difluoromethylene - 16α - methyl-4-pregnane-3,20-dione as test compound: The test substance in sesame oil is administered to 21 day old castrate male mice once daily for 7 days by subcutaneous injection. Testosterone is administered concurrently as a suspension in carboxymethylcellulose in water (5%) also by subcutaneous injection (total dose of testosterone=0.8 mg./mouse). The test substance is graded according to its ability to inhibit the testosterone-induced hypertrophy of the seminal vesicle. Progesterone is a standard in this test. The test compound (total dose of 10 mg.) gave a greater amount of inhibition than did progesterone (total dose of 10 mg.). For the sake of comparison, the formulae of progesterone and the test compound are given below:

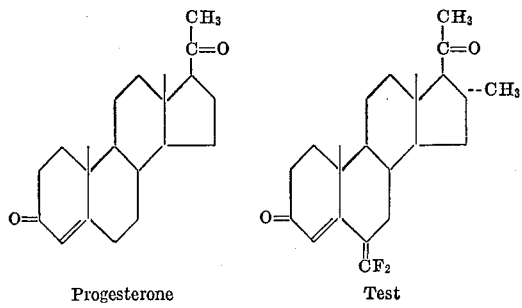
Progesterone        Test

As is known, anti-androgenic steroids are valuable agents in the therapeutic treatment of prostatic carcinoma in male mammals [see, for example, the article by Huggins in Cancer Research, 16, 825 (1956)] and have been proposed for use in the treatment of other disorders such as post-puberal and idiopathic hirsutism in female mammals, and the Stein-Leventhal syndrome [see, for example, Saunders et al., Steroids, 3, 687 (1964), listing leading references].

Finally, the compounds of this invention possess potent anti-estrogenic and anti-gonadotrophic activity without accompanying androgenic effects and are, consequently, useful in the treatment of menopausal difficulties and premenstrual tension.

Since obvious modifications and equivalents in the invention will be evident to those skilled in the chemical arts, we propose to be bound solely by the appended claims.

The embodiments of the invention in which an exclusive property or privilege is claimed are defined as follows:

1. A steroid of the group consisting of (I) 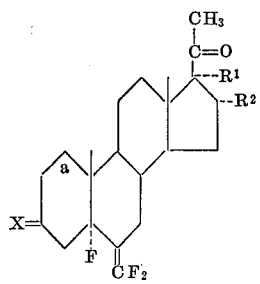

and (II) 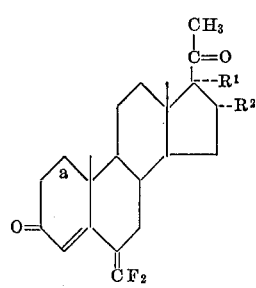

wherein $R^1$ is H, OH or O-Acyl, Acyl being the acyl radical of a lower alkanoic acid and $R_2$ is H or $CH_3$; X is selected from the group consisting of

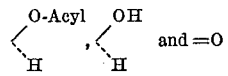

Acyl being as above; and $a$ is a single bond or a double bond.

2. The compound of Formula I of claim 1 in which $R^1$=acetoxy, X=acetoxy and hydrogen, $a$ is a single bond and $R^2$=hydrogen, 3β,17α-diacetoxy - 6 - difluoromethylene-5α-fluoropregnane-20-one.

3. The compound of Formula I of claim 1 in which $R^1$=hydroxy, X=hydroxy and hydrogen, $a$ is a single bond and $R^2$=hydrogen, 3β,17α-dihydroxy - 6 - difluoromethylene-5α-fluoropregnane-20-one.

4. The compound of Formula I of claim 1 in which X=hydroxy and hydrogen, $R^1$=acetoxy, $R^2$=hydrogen and $a$ is a single bond, 3β-hydroxy - 17α - acetoxy-6-difluoromethylene-5α-fluoropregnane-20-one.

5. The compound of Formula I of claim 1 in which X=acetoxy and hydrogen, $R^1$=$R^2$=hydrogen and $a$ is a single bond, 3β-acetoxy - 6 - difluoromethylene-5α-fluoropregnane-20-one.

6. The compound of Formula I of claim 1 in which X=hydroxy and hydrogen, $R^1$=$R^2$=hydrogen and $a$ is a single bond, 3β-hydroxy - 6 - difluoromethylene-5α-fluoropregnane-20-one.

7. The compound of Formula I of claim 1 in which X=oxo, $R^1$=acetoxy, $R^2$=hydrogen and $a$ is a single bond, 17α-acetoxy - 6 - difluoromethylene - 5α - fluoropregnane-3,20-dione.

8. The compound of Formula II of claim 1 in which $R^1$=acetoxy, $R^2$=hydrogen and $a$ is a single bond, 17α-acetoxy-6-difluoromethylene-4-pregnene-3,20-dione.

9. The compound of Formula I of claim 1 in which X=acetoxy and hydrogen, $R^1$=hydrogen, $R^2$=methyl and $a$ is a single bond, 3β-acetoxy-16α-methyl-6-difluoromethylene-5α-fluoropregnane-20-one.

10. The compound of Formula I of claim 1 in which X=hydroxy and hydrogen, $R^1$=hydrogen, $R^2$=methyl and $a$ is a single bond, 3β-hydroxy - 16α - methyl-6-difluoromethylene-5α-fluoropregnane-20-one.

11. The compound of Formula I of claim 1 in which X=oxo, $R^1$=hydrogen, $R^2$=methyl and $a$ is a single bond, 6-difluoromethylene - 16α - methyl-5α-fluoropregnane-3,20-dione.

12. The compound of Formula II of claim 1 in which $R^1$=hydrogen, $R^2$=methyl and $a$ is a single bond, 6-difluoromethylene-16α-methyl-4-pregnene-3,20-dione.

13. The compound of Formula II of claim 1 in which $R^1$=acetoxy, $R^2$=hydrogen and $a$ is a double bond, 6-difluoromethylene-17α-hydroxypregna - 1,4 - dien-3,20-dione acetate.

References Cited
UNITED STATES PATENTS 3,157,679  11/1964  Bork et al.

OTHER REFERENCES

Kamp et al.: "Recuerl" (1965), vol. 84, pp. 904–917 relied on.

ELBERT L. ROBERT, Primary Examiner

U.S. Cl. X.R.

260—397.4, 999